US007228465B1

(12) United States Patent
Hedger

(10) Patent No.: US 7,228,465 B1
(45) Date of Patent: Jun. 5, 2007

(54) BIT RATE AGILE ONBOARD TELEMETRY FORMATTER

(75) Inventor: Donald L. Hedger, Killdeer, ND (US)

(73) Assignee: Killdeer Mountain Manufacturing, Inc., Killdeer, ND (US)

( * ) Notice: Subject to any disclaimer, the term of this patent is extended or adjusted under 35 U.S.C. 154(b) by 502 days.

(21) Appl. No.: 10/438,844

(22) Filed: May 16, 2003

Related U.S. Application Data

(60) Provisional application No. 60/380,933, filed on May 17, 2002.

(51) Int. Cl.
*G06F 11/00* (2006.01)

(52) U.S. Cl. ...................... 714/701; 714/704; 714/707; 714/776; 340/853.3; 340/825.5; 375/368; 370/535

(58) Field of Classification Search ................ 714/701, 714/724, 733; 340/853.3; 375/368
See application file for complete search history.

(56) References Cited

U.S. PATENT DOCUMENTS

| | | | | |
|---|---|---|---|---|
| 4,833,466 | A * | 5/1989 | Lowenson et al. | 370/535 |
| 5,757,282 | A * | 5/1998 | Lotter | 340/870.05 |
| 6,081,570 | A * | 6/2000 | Ghuman et al. | 375/368 |
| 6,813,596 | B2 * | 11/2004 | Ellis et al. | 703/8 |
| 6,864,802 | B2 * | 3/2005 | Smith et al. | 340/870.07 |

* cited by examiner

*Primary Examiner*—Albert Decady
*Assistant Examiner*—Esaw Abraham
(74) *Attorney, Agent, or Firm*—James Creighton Wray

(57) ABSTRACT

A bit rate Agile Onboard Telemetry formatting system addresses the increased demands on the efficiency of telemetry systems. The present invention thins and reorders data streams, adjusting bit rates of a PCM stream using a bit-locked loop to match the desired information rate exactly. The present invention accomplishes the adjustment through hardware by synthesizing a clock whose operating frequency is derived from the actual timing of the input format. Firmware manages initialization and error management.

18 Claims, 6 Drawing Sheets

BRAOTF SOFTWARE

BIT RATE AGILE ONBOARD TELEMETRY FORMATTER

This application claims the benefit of U.S. Provisional Application No. 60/380,933, filed May 17, 2002.

This invention was made with Government support under Contract No. F0461 1-0-C-0017, awarded by the U.S. Air Force. The Government has certain rights in this invention.

BACKGROUND OF THE INVENTION

Frequency spectrum availability for use in telemetry is decreasing, and hardware to support efficient use of this spectrum needs to be developed. Existing (legacy) data collection systems waste a significant portion of this spectrum through inefficiencies. Data cycle maps generated by current systems contain inefficiencies due to:

1.) the limited selection of bit rates available for data transmission that typically do not match the users real data requirements;

2.) the fill words and/or bits generated due to restrictions in the data collection process and the need to comply with telemetry "standards" and existing infrastructures.

The amount of bandwidth available for transmitting data streams is shrinking while at the same time sophisticated data acquisition systems are increasing the volume of data that must be transmitted. Typical current procedures result in bit streams in which over 50% of the bits transmitted are not required to process the data.

Needs exist for improved telemetry systems.

SUMMARY OF THE INVENTION

The present invention provides a mechanism to discard information and fill bits that are not required to be transferred via the telemetry link and then to generate a bit rate that exactly equals the bit rate required to transfer the information that was retained. Further, the invention reorders this retained data in a manner that is compatible with a range of existing telemetry infrastructures. The invention provides a bit rate agile digital cycle mapping (DCM) generator that uses as its input the DCMs generated by other data collection instrumentation systems. The invention is capable of generating new DCMs that contain selected information from the original DCMs are optionally reordered, and then generating a data transfer clock (bit rate clock) that exactly matches the average rate of the retained information.

The DCM generator is flexible and programmable for use with various instrumentation systems, such as the Common Airborne Instrumentation System (CAIS), the Advanced Airborne Test Instrumentation System (AATIS), etc. It is not limited to one proprietary instrumentation system or to instrumentation systems intended for airborne applications.

The formatter is a small, versatile, and ruggedized device, which adequately meets the needs of operation in harsh environments, such as those found in onboard test vehicles. The DCM generator operates from an input that conforms to current DCM standards and requires only a parallel or serial data stream plus a clock signal. That, in combination with the fact that it operates at the "bit" level, makes the invention universally applicable and independent of the particular characteristics of the original DCM, such as word length, frame, length, bit rate, etc.

The DCM generator provides an open communication architecture that is compatible with plug and play concepts.

The invention contains a bit rate generator that is synchronized to the incoming data and produces a transfer clock that forces the time average of output bits to exactly equal the time average of the bits retained from the input DCM. Because it operates on bits rather than frequency, it is referred to as a Bit Locked Loop (BLL). The BLL is a closed loop control system housing a controller and an output buffer. The objective is not to control the frequency of a numerically controlled oscillator (NCO), but to maintain the number of bits accumulated in the output buffer at zero. The NCO is a part of the control loop, akin to actuators found in mechanical systems. The BLL incorporates pre and post scaling that reduces output jitter caused by finite resolution in the error signal and settability of the NCO. Further, by using bits as the controlled parameter, the system can be normalized making the actual control loop coefficient independent of the characteristics of the input DCM.

The formatter validates bit rate agility, word length agility, and bandwidth savings in ground based and airborne tests. The invention has applications for any user of telemetry. The efficient use of telemetry or other bandwidths is dictated by the increased amount of data to be transmitted and decreased bandwidth availability. The invention allows for a flexible bit rate agile telemetry or data transfer system that addresses needs in the field.

These and further and other objects and features of the invention are apparent in the disclosure, which includes the above and ongoing written specification and the drawings.

DETAILED DESCRIPTION OF THE PREFERRED EMBODIMENTS

The Bit Rate Agile Onboard Telemetry Formatter (BRAOTF) or DCM generator is a device that has the capability to discard unwanted information from blocks of periodic data (bit masking) and reordering the bits (bit mapping) to produce a continuous serial output that contains the retained information reorganized into any arbitrary sequence of data bits.

The present invention includes a hardware module and controlling firmware. A supporting software module creates the file (image load) that contains operational data used to control the output bit rate and the specification of the mask or map, and manages the ground support equipment used to upload the image.

This generic capability can support a variety of applications including, but not limited to, improving the efficiency of telemetry streams generated by the division multiplexing systems used to gather data from test articles, such as aircraft and ground vehicles. In particular, it supports parallel/serial input DCMs and serial output DCMs that conform to Inter-Range Instrumentation Group (IRIG) Standards.

To accomplish its intended function, the BRAOTF preferably embodies three key concepts. These are Bit Masking, Bit Mapping, and a Bit Locked Loop. The combined use of these concepts produces a unique capability that does not exist in conventional devices. The Bit Locked Loop represents a new and novel approach to synchronizing a clock generator to an external timing source.

The present invention interfaces with an existing data acquisition system. It modifies the stream produced by the data acquisition system and outputs the modified bit stream. A control program dictates the details of the modification. Using the control program, an internal decommutator parses the stream output by the data acquisition system and supplies data to the BRAOTF control processor. The processor manages the production of the output format, data cycle map (DCM). A clock generator uses these data to synthesize a clock whose frequency controls the transmission of bits retained. These bits are stored in a dual-bank memory, supporting parallel processing and transmission of successive data cycles, major frames. The PCM stream output by BRAOTF is typically Class II, unless the user is careful in selecting the bits to be retained and/or optionally reordered. However, when operated in a map mode and supported by appropriate software algorithms, BRAOTF produces Class I output.

Supporting software creates the control program. The software interfaces to a database that contains the specification of a DCM. This DCM is modified using both mask data contained in the database and user input. The software creates the load image, containing the control program and updates the database. The control program is uploaded to BRAOTF memory from ground support equipment (GSE).

Figure 1:
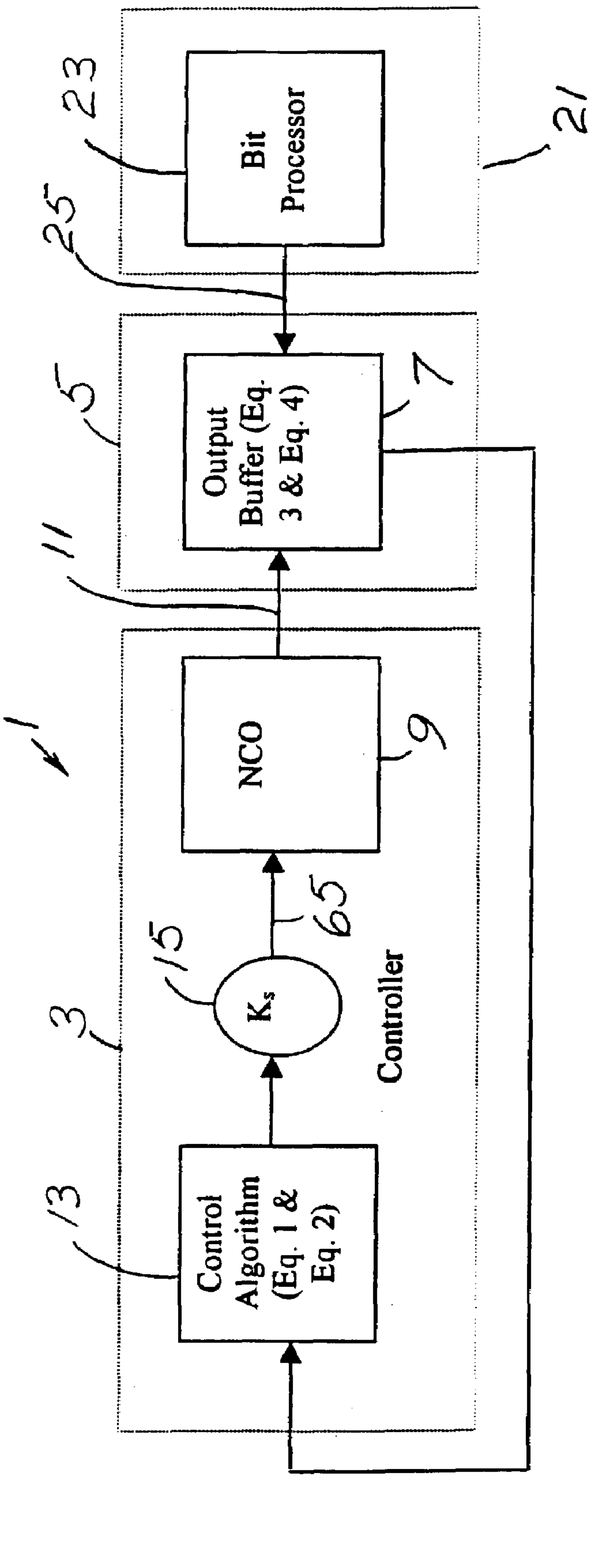
FIG. 1 is a closed loop BLL control system.

As shown in FIG. 1, the Bit Locked Loop (BLL) 1 is a closed loop control system including a controller 3 and an output buffer 5. The objective is to control the time average of the bits accumulated in the output buffer 7 to zero. The numerically controlled oscillator (NCO) 9 is the actuator used to accomplish this. The NCO 9 removes bits from the output buffer 7, while the bit processor 23, part of the bit processing module 21, adds bits 25 to the output buffer 7. The added bits are derived from the input DCM by the bit processor 23.

Equation 1 and Equation 2 define the control algorithm 13 of controller 3. The value of $X_b$ is obtained from the output buffer 7 (or emulation thereof). Equation 3 and Equation 4 can model the output buffer 7 for the purposes of determining the transient's performance of the actual system. $K_s$ 15 is a constant that is computed from the time characteristics of the input DCM and serves to de-normalize the loop performance.

As shown in FIG. 1, the Bit Locked Loop 1 produces an infinitely variable clock 11 locked to the input data rate for outputting the data. The clock generator consists of a numerically controlled oscillator (NCO) 9 driven by an integral controller 3. The control algorithm 13 is implemented in a digital signal processor (DSP) or equivalent device. The controller dithers the NCO in order to achieve the required infinite variability. The error signal is developed from the actual bits accumulated per unit time and the expected number of bits that would be accumulated per unit time, assuming the clock generator is operating at the ideal frequency. The bits accumulated per unit time is generated in the output buffer 7 and is the difference between the scaled NCO 9 frequency and the bits generated by the bit processor 23.

The creation of a stable output bit rate is based on data characteristics. The Bit Locked Loop 1 maintains this important aspect of the present invention. Initial values of parameters for the bit locked loop are determined by specification of the data acquisition system output stream. The DSP computes subsequent adjustment of these parameters, locking in and maintaining a stable output bit rate. The NCO 9 directly controls the output bit rate. A reliable, accurate and stable output bit rate is produced. The clock rate generated produces a bit rate that almost exactly matches the rate at which the retained bits are to be transmitted. The average variations in the ratio of output bit rate to input bit rate is about $2.2\times10^{-9}$. The present invention design locks to the incoming bit stream in fewer than about 10 frames.

Figure 2:
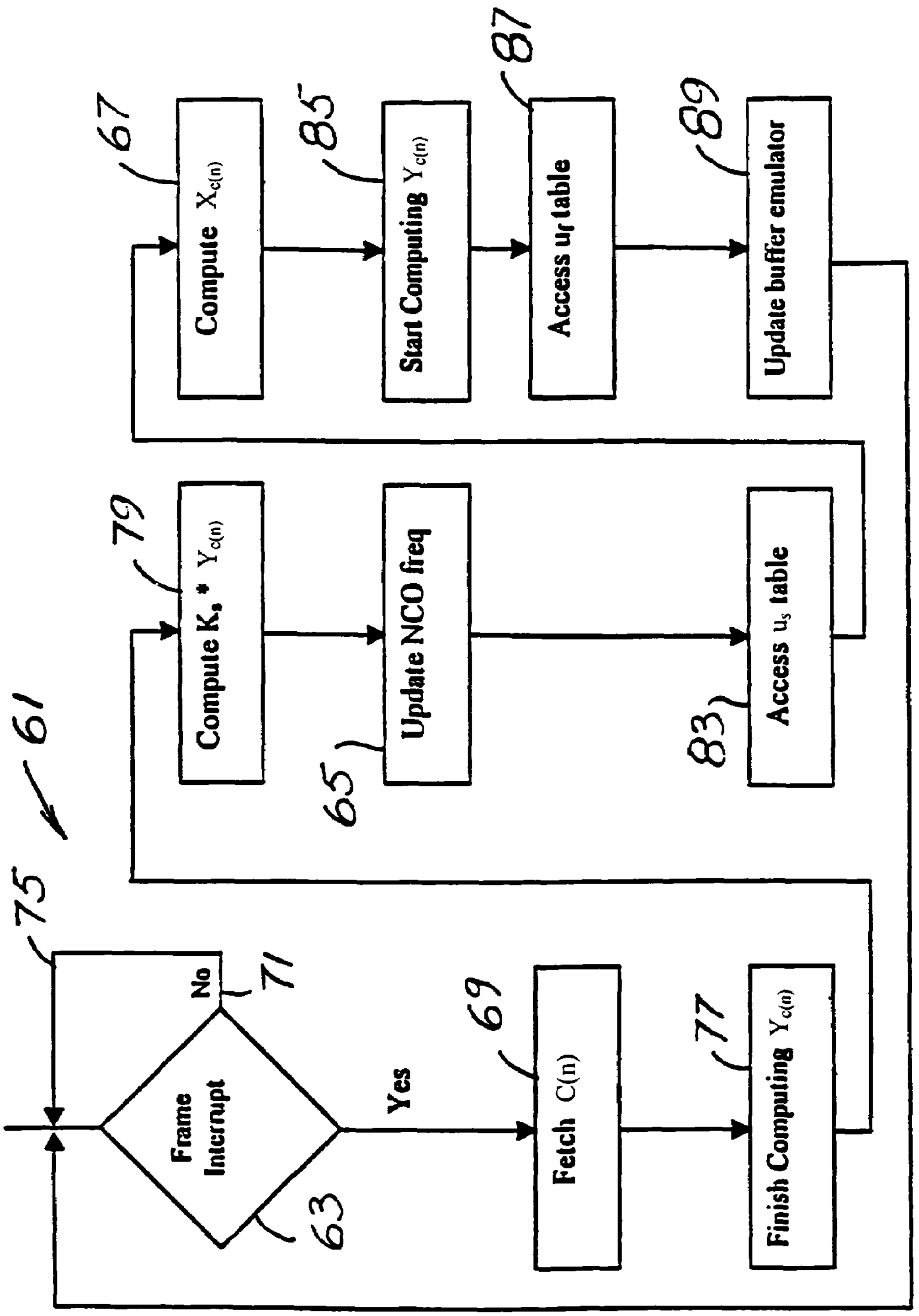
FIG. 2 is a control algorithm flowchart.

FIG. 2 shows the control algorithm flow chart 61. The time between the input DCM frame interrupt 63 and the update 65 of the NCO 9 is critical. The implementation must be structured to minimize the otherwise control loop characteristics, and stability will be adversely affected. The allowable time is a function of the time interval between frame interrupts 63. Initializing the loop variables $x_c$ and x, to their expected final values is needed if the effects of start up transients are to be minimized, allowing the system to become operational more quickly.

The algorithm waits in decision block 63 until a frame interrupt occurs and then exits to fetch $x_b(n)$ 69. The value of C(n) is fetched 69 and the computation of X(b) is executed. The computation of $Y_{c(n)}$ is finished 77. A constant Ks 79 multiplies the value of Yc. The result is used to update 65 the operating frequency of NCO 9. The $u_s$ table is accessed 83 for the next expected value of X(b). $X_{c(n)}$ is computed 67. The computation of the next $y_{c(n)}$ 85 is started. The $U_f$ table is accessed 87 for the bits retained, and the buffer emulator is updated 89.

An expected value table can be generated from the simplest periodic distribution of integer bits that produces the desired number of bits per unit time, rather than the actual bits per unit time.

Figure 3:
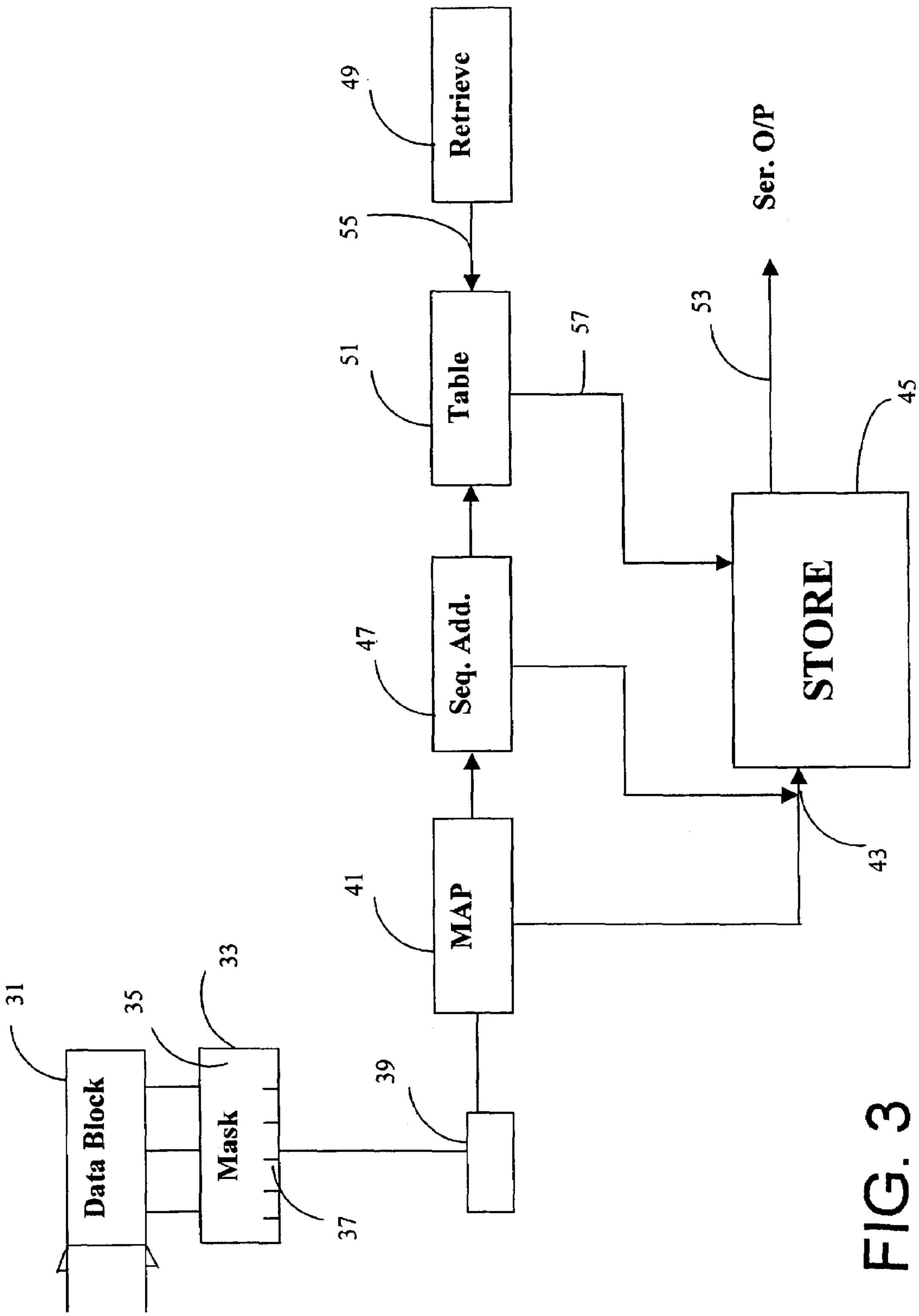
FIG. 3 shows a system with reduced serial output.

The bit masking and bit mapping processes are shown in FIG. 3. For bit masking, the bits to be retained in the input DCM 31 are identified in the DCM mask 33. The DCM mask 33 consists of a series of sequential bits that equals the length of the input DCM. A "1" denotes a bit that is to be retained in the input DCM, and a "0" denotes a bit that is to be discarded in the input DCM. The DCM mask 33 is synchronized to the input DCM 31, and each bit location is tested 35 to determine what bits are to be retained 37. The bits that are retained pass through 39 the bit mapping 41 and are stored 43 in an output buffer 45 until they are used to generate the new output 53.

For bit mapping, all the bits of the input DCM 31 are stored in random access memory 41. The positions in the input DCM of the bits to be retained are stored in Table 51 in the order in which they are to appear in the output DCM 53. The Table 51 is accessed sequentially for the address of data to be sent 55 and retrieved 49 from random access memory 41. The retrieved data bits are stored in an output buffer 45 until they are used to generate the new output DCM 53.

Firmware for the BRAOTF is functionally an embedded operating system. The firmware is relatively simple and robust. The tasks managed by the BRAOTF control firmware include transfer of the load image, management of the data stream, system initialization and management of errors. The first three functions are implemented and provide for inclusion of error detection functionality. The firmware design includes drivers for map memory, mask memory, nonvolatile memory, the internal decommutator, digital signal processor and the output generator.

The transfer of the load uses a modified Xmodem or similar file transfer protocol. The first packet transferred consists of control and setup data. Its contents are used to configure the microprocessor nonvolatile control memory. The protocol processes the contents separately from the subsequent packets, each of which consist of data and are stored in mask or map memory. Transmission errors are managed with checksums containing provisions in the design for cyclic redundancy check (CRC), if required. Because the physical connection used for transfer is an industry standard, the use of checksums provide adequate levels of robustness in operational use.

During the operation of the present invention, the firmware selects bits and if bit mapping is enabled, reorders those bits. The bit masking function is driven by mask stored in mask memory. Bit mapping is controlled by a sequence of addresses stored in map memory. In both cases, the memory is organized to ensure efficient processing of the data stream. The bit mask is an ordered collection of bits specifying which bits are to be retained, one bit for each bit in a major frame. Mask memory size supports as many as about 8 DCMs of up to approximately 8192 bits/minor frame and up to approximately 256 minor frames/major frame. The map memory size will support up to two maximum length formats of approximately 8192 bits/minor frame by approximately 256 minor frames/major frame. The memory can be allocated flexibly to support up to about 8 formats of lesser size.

In-flight error detection and recovery are possible. The design includes support for hardware capabilities, such as checksum computation and comparison, as well as the ability to choose an alternative DCM and to designate a default DCM.

Figure 4:
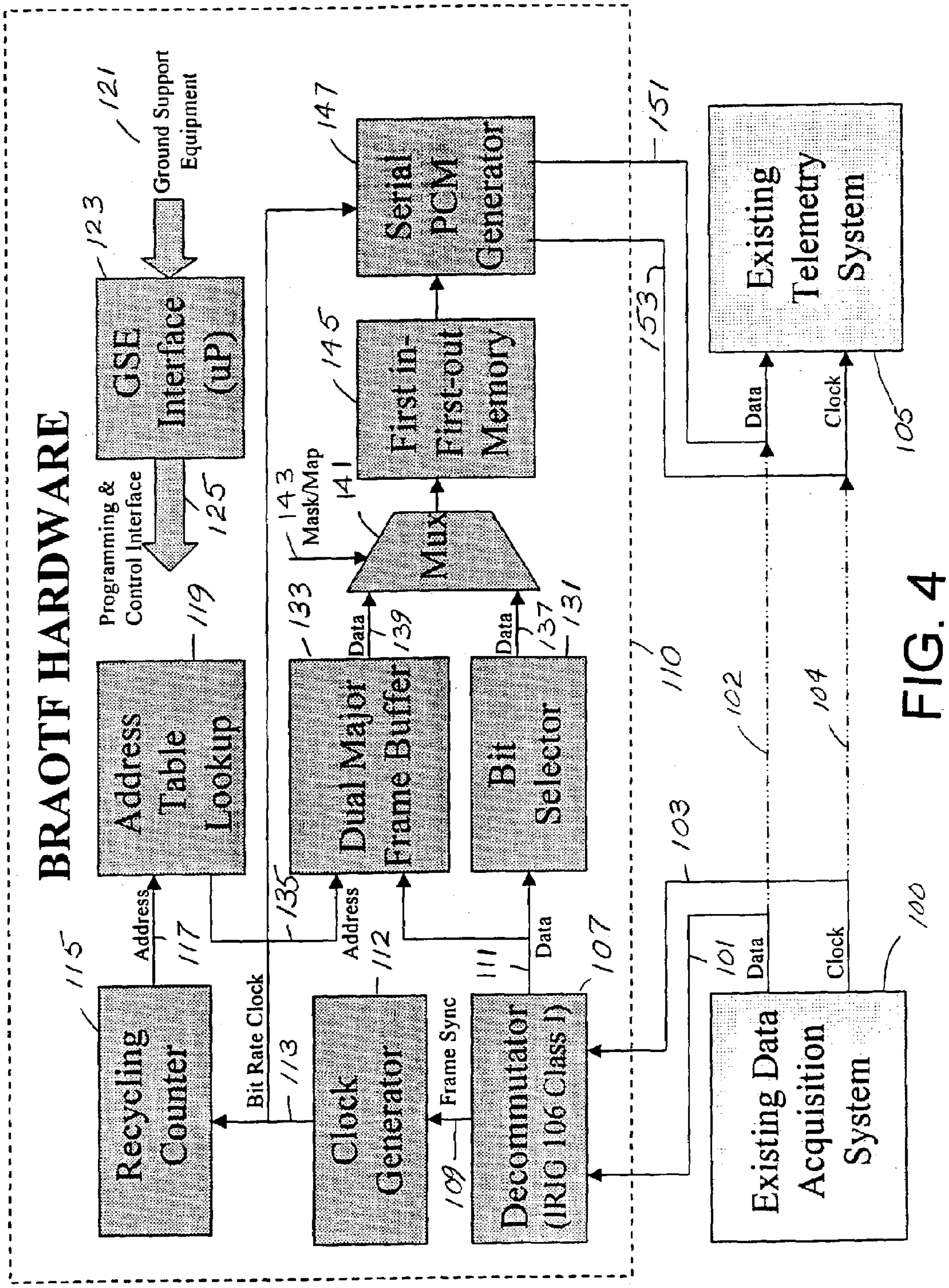
FIG. 4 schematically shows BRAOTF hardware.

The new invention, as shown in FIG. 4, uses an existing data acquisition system 100 and an existing, telemetry system 105. In pre-existing systems, data 102 and clock signals 104 were supplied as a large amount of bits using substantial bandwidth from the data acquisition system 100 to the remote telemetry system 105. While for the most part the old telemeter systems worked well, they transmitted far too much data and used too much bandwidth. The fixed systems could handle the volume of data but bandwidth is becoming scarcer. Data compression in and of itself is not the answer, because different tests and measurements produce differing amounts of significant bits. Old systems used standard word lengths, which added to the problems. Words had to be filled with unnecessary bits, which further taxed the systems.

In the new system, data signals 101 and clock signals 103 are provided from the existing data acquisition system 100 to a decommutator 107. The decommutator 107 provides a frame sync signal 109 to a clock generator 112. Bit rate clock signals 113 are supplied to a recycling counter 115 and to a serial pulse code modulation generator 147. Output data 111 from the decommutator 107 is supplied to a bit selector 131 and to a dual major frame buffer 133. Transmitting accurate and synchronized data and clock signals are important and are provided by the invention.

The recycling counter 115 provides a signal 117 to the address table lookup 19. Ground support equipment 121 controls a ground support equipment interface 123, which supplies programming and control interface signals 125 to the new system, including the address table lookup 119.

The address table lookup 119 supplies addresses 135 to the dual major frame buffer 133. The bit selector 131 and the dual major frame buffer 133 supply data bits 137 and 139 to multiplexer 141. Mask and map signals 143 are supplied to the multiplexer. The output from the multiplexer is supplied to a first in, first out memory 145. The output of the first-in, first-out memory is supplied to serial PCM generator, which receives a bit rate clock signal 113. Data signals 151 and clock signals 153 are supplied from the serial pulse code modulator 147 to the existing telemetry system 105. The coordinated and synchronized data bit and clock bit signals are divided into chips, which are coded and multiplexed, such as by time division or code division or other multiplexing and are transmitted as addressed data packets in a radio frequency transmission channel.

While the system is used primarily to transmit test and performance data to remote receiving stations in real time or near real time, it may have many uses. For example the new systems may be used to transmit synchronized data and clock signals from operational vehicles to remote stations for digital recordings and records for later study. Examples are vehicles such as aircraft and trucks, busses and automobiles may benefit from the new telemetry systems. The systems may augment or replace onboard recorders used in commercial aircraft.

Figure 5:
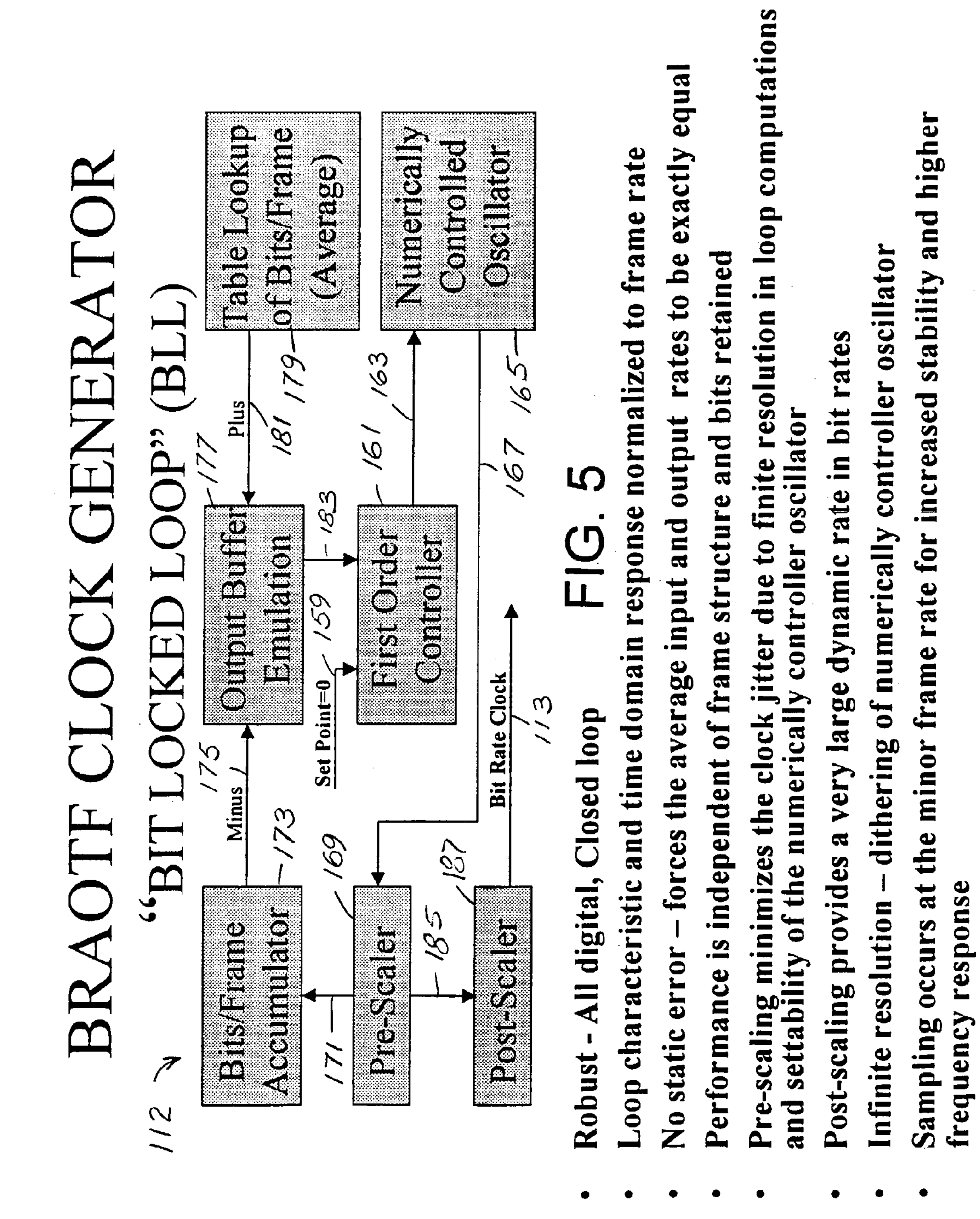
FIG. 5 schematically shows a BRAOTF clock generator.

As shown in FIG. 5, the clock generator 112, which produces the bit rate clock signals 113, has a first order controller 161, which is supplied with a zero set point signal 159. The output 163 of the first order controller 161 is supplied to the numerically controlled oscillator 165, which supplies a signal 167 to pre-scaler 169. Pre-scaler 169 supplies a signal 171 to bits/frame accumulator 173. Accumulator 173 supplies a minus signal 175 to output buffer emulation 177. A table lookup of bits/frame average 179 supplies plus signals 181 to the output buffer emulation 177. The output buffer emulation 177 supplies plus, minus or zero signals 183 to the first order controller 161. When the output 183 is either plus or minus, the input 163 to the numerically controlled oscillator 165 changes, if necessary, the output 167 to the pre-scaler 169 and its output 185 to the post-scaler 187, which delivers the bit rate clock signal 113.

The clock generator is robust, all digital and a closed loop. Loop characteristic and time domain response is normalized to frame rate. No static caused error exists. The average input and output rates are forced to be exactly equal. Performance is independent of frame structure and bits retained. Pre-scaling minimizes clock jitter due to finite resolution in the loop computations and setability of the numerically controlled oscillator. Post-scaling provides a very large dynamic rate in bit rates. Infinite resolution and dithering of the numerically controlled oscillator are provided. Sampling occurs at the minor frame rate for increased stability and higher frequency response.

Figure 6:
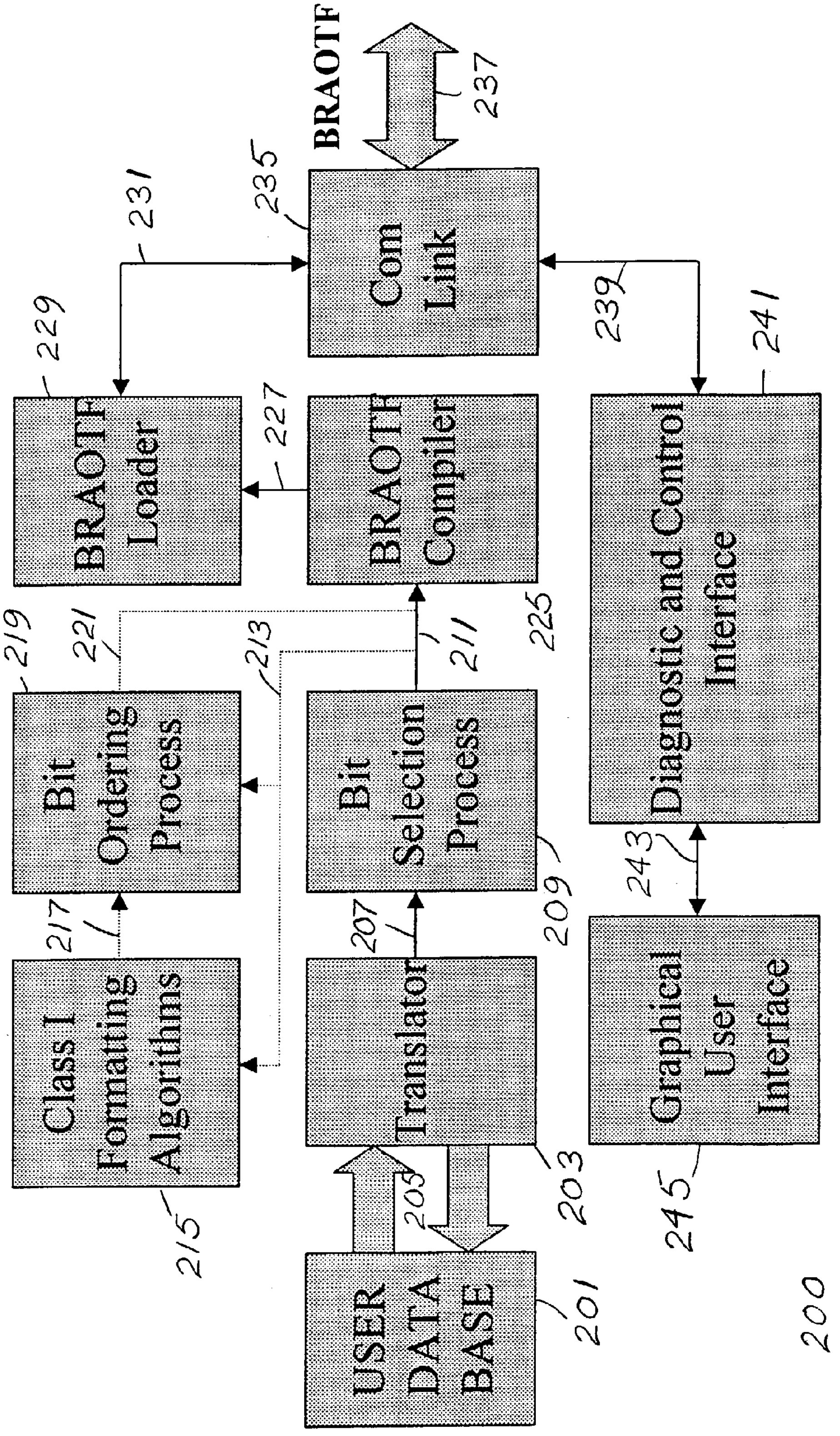
FIG. 6 schematically shows BRAOTF software.

FIG. 6 shows a software diagram 200. The software contains two modules, one to interface with a supporting database 201 to produce a load image and the other interfaces with the BRAOTF 237 to support transferring the load image to BRAOTF control memory. The user database 201 and a translator 203 communicate 205. The translator 203 controls 207 the bit selection process 209. The bit selection process 209 controls 213 the class I formatting algorithms 215 and subsequently 217 the bit ordering process 219. The bit ordering process output 221 and the bit selection process output 211 control compiler 225. The compiler supplies signals 227 to the loader 229, and the loader supplies signals 231 to the communications link 235. Communications 237 are conducted with the existing telemetry system. The communications link 235 is connected 239 to the diagnostic and control interface 241, which is connected 243 to the graphical user interface 245.

Each of the two main modules is further subdivided into two sub-modules. The module that produces the load image is factored into a sub-module that manages user and database interfaces and a sub-module that manages the creation of the load image. The interface sub-module is further factored, producing a design that supports access to multiple database environments and, thus, becoming portable. Similarly, the load image sub-module supports future adjustments to the structure of that file.

The second module that interfaces to the BRAOTF is factored into a sub-module that manages the transfer and one that manages the user interface. The module that produces the load image updates the database with which it interfaces to support decommutation of the bit stream output by BRAOTF. It uses standard SQL for its accesses and updates. This module uses an Xmodem-based or equivalent protocol to manage the transfer of the load image. The protocol used treats the first packet as a header that specifies how subsequent packets are to be processed.

The new invention is compatible with existing systems and supports alternative output formats. The invention supports input rates of up to about 10 Mbytes/sec and output rates of up to about 10 Mbits/sec. Power requirements and ranges of values of environmental parameters are essentially identical to those of current data acquisition systems. An internal serial/parallel decommutator produces data and clock signals. A serial NRZ, RNRZ, Bi-phase output provides data and coordinated signals. Data processing provides random input data selection at the bit level and arbitrary output data rearrangement at the bit level. Clock generation is synthesized from input data stream. Time average exactly matches the time average of bits retained from input stream. Clock output is continuous and has low jitter.

The Equations attached hereto are part of the disclosure. The Definitions attached hereto are part of the disclosure and describe what is shown in FIG. 2.

While the invention has been described with reference to specific embodiments, modifications and variations of the invention may be constructed without departing from the scope of the invention.

The invention claimed is:

1. An onboard telemetry formatter comprising:

means for receiving sensed operational information, means for masking the received information means for providing for discarding of information not required for transmission and saving required information, means for providing a bit rate that exactly equals a bit rate required to transfer information, means for reordering data in a manner compatible with telemetry systems, means for providing a continual serial output of the required information, means for providing for bit rate generation synchronized with incoming data, and means for producing a transfer clock for forcing time average of output bits to exactly equal time average of bits retained from the input.

2. The onboard telemetry formatter of claim 1, further comprising a bit locked loop:

an output buffer, a bit processor for providing input to the output buffer, a controller, wherein the output buffer receives bits from the bit processor and provides bits to the controller, and wherein the controller further comprises a control algorithm, a constant controller and a numerically controlled oscillator.

3. The onboard telemetry formatter of claim 2, the control algorithm further comprising:

waiting for a frame interrupt, providing a signal from the frame interrupt to a fetch function, computing values of variables, updating an operating frequency of the numerically controlled oscillator, accessing a table to get a next expected value of a variable, computing next variables in a sequence, accessing a table to determine bits retained, and updating a buffer emulator.

4. The onboard telemetry formatter of claim 1, the means for masking further comprising a bit mapping and bit masking system with reduced serial output having:

a data block for receiving inputs, a mask synchronized with an input and a test for determining which bits are retained, a storage device for retaining bits, random access memory for storing bits for bit mapping, a table for sequential access and retrieval of address data, and an output buffer for storing data bits until they are serially output.

5. The onboard telemetry formatter of claim 1, further comprising a data acquisition and telemetry system having:

a data acquisition system, a telemetry system, a decommuter, a clock generator a bit selector and the dual major frame buffer, a recycling counter and a serial pulse code modulator generator, an address table lookup, means for providing data and clock signals between the data acquisition system and the telemetry system, means for providing new data and clock signals from the data and clock signals running from the existing data acquisition system to the decommuter, means for providing signals from the decommuter to the clock generator, the bit selector and the dual major frame buffer, a signal from the clock generator to a recycling counter and a serial pulse code modulator generator, means for providing a signal from the clock generator to the address table lookup, means for providing a signal from the address table lookup to the dual major frame buffer, means for providing a receiving signal from ground support equipment for inputting to the address lookup table, a multiplexer for combining the signals from the dual major frame buffer and the bit selector, means for providing a signal from the multiplexer to the first-in-first-out memory device, means for providing a signal form the first-in-first-out memory device to the serial pulse code modulator generator, and means for providing a signal from the serial pulse code modulator to the telemetry system.

6. The onboard telemetry formatter of claim 1, further comprising a clock generator having:

a bit/frame accumulator, a table lookup of bit/frame, an output buffer for accepting input from the bit/frame accumulator and from the table lookup of bit/frame, a first order controller for receiving input from the output buffer, a numerically controlled oscillator for receiving input from the first order controller, a pre-scaler for receiving input from the numerically controlled oscillator and supplying output to the bit/frame accumulator and to a post-scaler, and means for delivering a signal comprising an output of the post-scaler and to a bit rate clock signal.

7. The onboard telemetry formatter of claim 6, wherein the post-scaler provides a very large dynamic rate in bit rates.

8. The onboard telemetry formatter of claim 6, wherein average input and output rates are forced to be equal.

9. The onboard telemetry formatter of claim 6, wherein the pre-scaler minimizes clock jitter due to finite resolution in loop computations and settability of the numerically controlled oscillator.

10. The onboard telemetry formatter of claim 6, wherein sampling occurs at a minor frame rate for increased stability and higher frequency response.

11. The onboard telemetry formatter of claim 6, wherein the clock generator comprises an all digital and a closed loop.

12. The onboard telemetry formatter of claim 6, wherein performance is independent of the frame structure and bits retained.

13. The onboard telemetry formatter of claim 1, further comprising software having:

a user database and translator communicating with each other, a bit selection process controlled by the translator, a class I formatting algorithm controlled by the bit selection process, a bit ordering process controlled by the class I formatting algorithm, a compiler for receiving input from the bit selection process and bit ordering process, a loader for receiving input from the compiler, a communications link for receiving input from the loader, a diagnostic and control interface for connecting to the communications link and a graphical user interface.

14. A method for telemetering data comprising:

providing data and clock signals from a data acquisition system to a decommuter, providing frame synchronizing signals to a clock generator, providing bit rate clock signals from the clock generator, providing data from the decommuter to a bit selector, providing data from the decommuter to a frame buffer, providing the bit rate clock signals to a recycling counter and to a serial PCM(pulse code modulator) generator, providing signals from the counter to an address table lookup, providing an address from the lookup to the frame buffer, providing data from the bit selector and the frame buffer to a multiplexer, providing bits from the multiplexer to a memory buffer, providing bits from the multiplexer to the serial PCM generator, and providing data and clock signals from the serial PCM generator to a remote receiver.

15. The method of claim 14, further comprising providing mask and map signals to the multiplexer for controlling bits output from the multiplexer.

16. The method of claim 14 wherein the providing of a bit rate clock signal from a clock generator comprises:

providing a numerically controlled oscillator (NCO), providing an output buffer emulator, providing a first order controller with a set point and signals from the output buffer, providing a bit/frame average to the output buffer emulator for speeding the emulator, providing a signal from a bit/frame accumulator to the output buffer emulator for slowing the emulator, providing an output of the NCO to a pre-scaler, providing outputs of the pre-scaler to the bit frame accumulator and to a post-scaler, and providing an output of the post-scaler as the bit rate clock signal.

17. An onboard telemetry formatter method comprising:

receiving sensed operational information, masking the received information discarding of information not required for transmission and saving required information, providing a bit rate that exactly equals a bit rate required to transfer the required information, reordering data in a manner compatible with telemetry systems, providing a continual serial output of the required information, providing for bit rate generation synchronized with incoming data, and producing a transfer clock for forcing time average of output bits to exactly equal time average of bits retained from the input.

18. A data acquisition and telemetry method comprising:

providing an existing data acquisition system, providing an existing telemetry system, providing existing data and clock signals between the existing data acquisition system and the existing telemetry system, providing new data and clock signals from the existing data and clock signals running from the existing data acquisition system to a decommuter, providing signals from the decommuter to a clock generator, a bit selector and a dual major frame buffer, providing a signal from the clock generator to a recycling counter and a serial pulse code modulator generator, providing a signal from the clock generator to an address table lookup, providing a signal from the address table lookup to the dual major frame buffer, providing a signal from ground support equipment for inputting to the address lookup table, providing a multiplexer for combining the signals from the dual major frame buffer and the bit selector, providing a signal from the multiplexer to a first-in-first-out memory device, providing a signal form the first-in-first-out memory device to the serial pulse code modulator generator, and providing a signal from the serial pulse code modulator to the existing telemetry system.

* * * * *